(12) United States Patent  
Chang et al.

(10) Patent No.: US 11,429,775 B1  
(45) Date of Patent: Aug. 30, 2022

(54) AUTOMATIC GENERATION OF SUB-CELLS FOR AN ANALOG INTEGRATED CIRCUIT

(71) Applicant: Taiwan Semiconductor Manufacturing Company, Ltd., Hsinchu (TW)

(72) Inventors: Chih-Chiang Chang, Taipei (TW); Wen-Shen Chou, Hsinchu (TW); Yung-Chow Peng, Hsinchu (TW); Yung-Hsu Chuang, Hsinchu (TW); Yu-Tao Yang, Hsinchu (TW); Bindu Madhavi Kasina, Hsinchu (TW)

(73) Assignee: Taiwan Semiconductor Manufacturing Company, Ltd., Hsinchu (TW)

( * ) Notice: Subject to any disclaimer, the term of this patent is extended or adjusted under 35 U.S.C. 154(b) by 0 days.

(21) Appl. No.: 17/212,499

(22) Filed: Mar. 25, 2021

(51) Int. Cl.
*G06F 30/392* (2020.01)
*G06F 30/398* (2020.01)
*G06F 119/18* (2020.01)
*G06F 30/31* (2020.01)

(52) U.S. Cl.
CPC .......... *G06F 30/392* (2020.01); *G06F 30/398* (2020.01); *G06F 30/31* (2020.01); *G06F 2119/18* (2020.01)

(58) Field of Classification Search
CPC ...................................................... G06F 30/392
USPC ........................................................ 716/124
See application file for complete search history.

(56) References Cited

U.S. PATENT DOCUMENTS

2006/0265675 A1* 11/2006 Wang .................... G06F 30/398  
716/112

* cited by examiner

*Primary Examiner* — Eric D Lee  
(74) *Attorney, Agent, or Firm* — Merchant & Gould P.C.

(57) ABSTRACT

Various techniques are disclosed for automatically generating sub-cells for a non-final layout of an analog integrated circuit. Device specifications and partition information for the analog integrated circuit is received. Based on the device specifications and the partition information, first cut locations for a first set of cuts to be made along a first direction of a non-final layout of the analog integrated circuit and second cut locations for a second set of cuts to be made along a second direction in the non-final layout are determined. The first set of cuts are made in the non-final layout at the cut locations to produce a temporary layout. The second set of cuts are made in the temporary layout at the cut locations to produce a plurality of sub-cells.

20 Claims, 14 Drawing Sheets

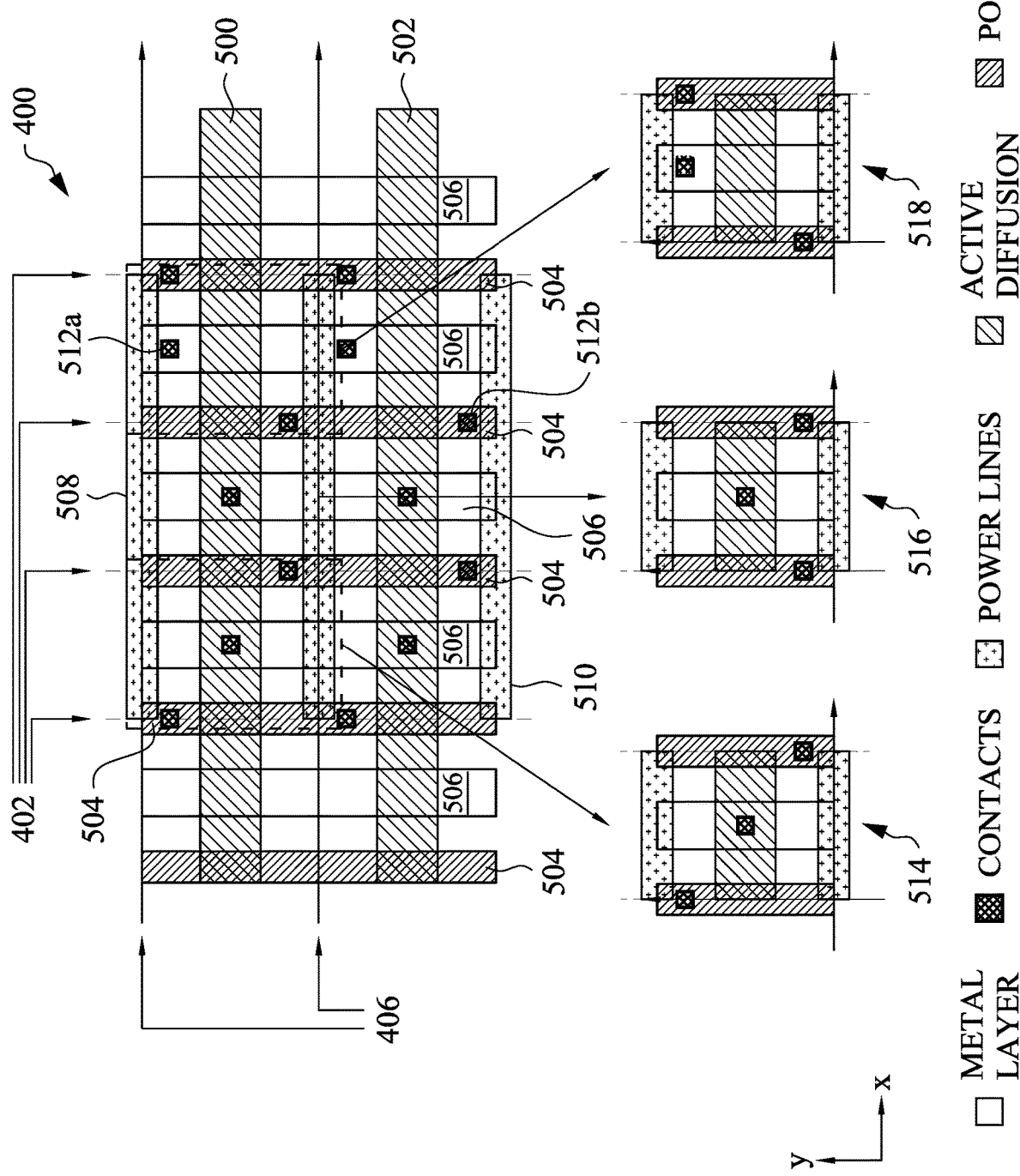

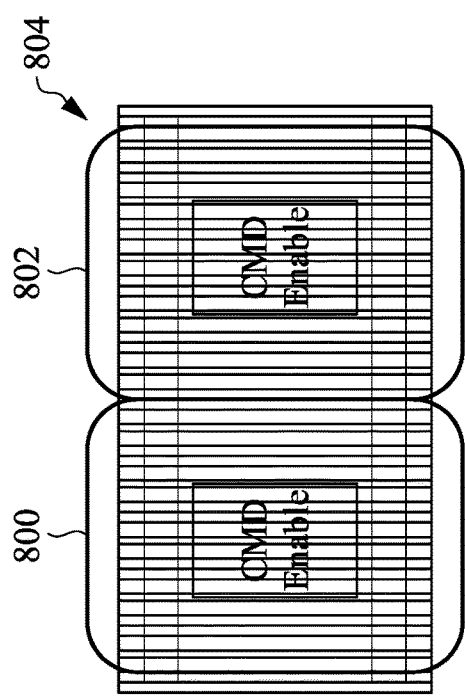
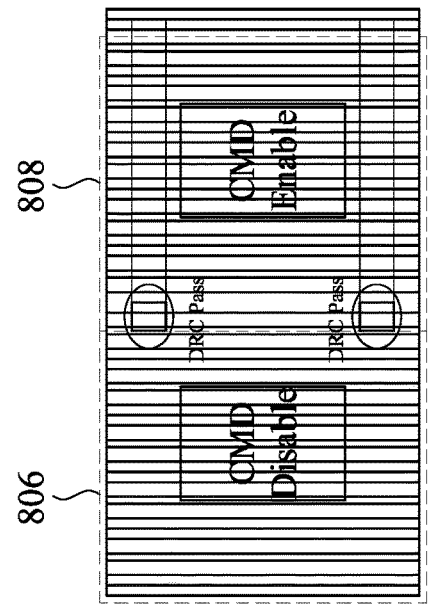
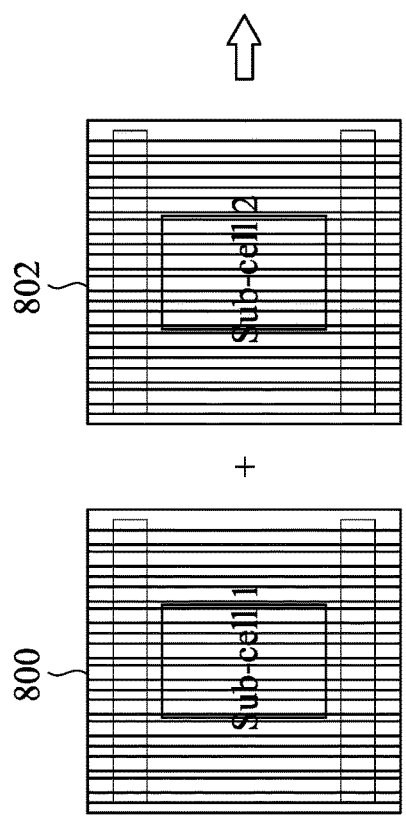
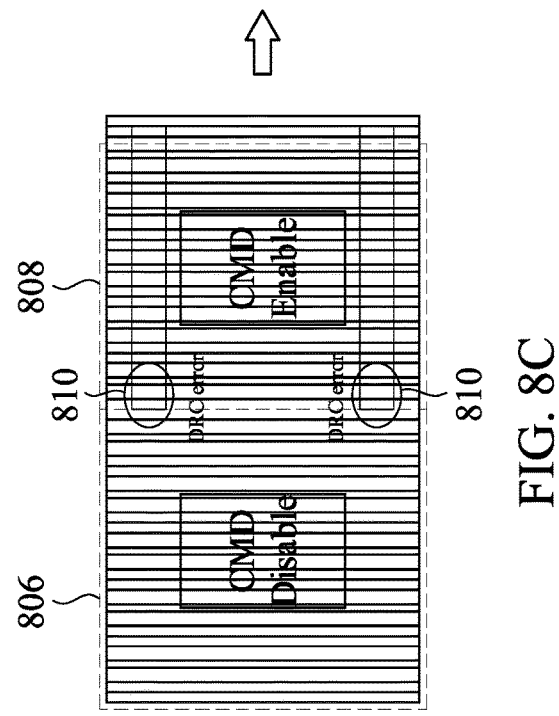
FIG. 8A
FIG. 8B
FIG. 8C
FIG. 8D

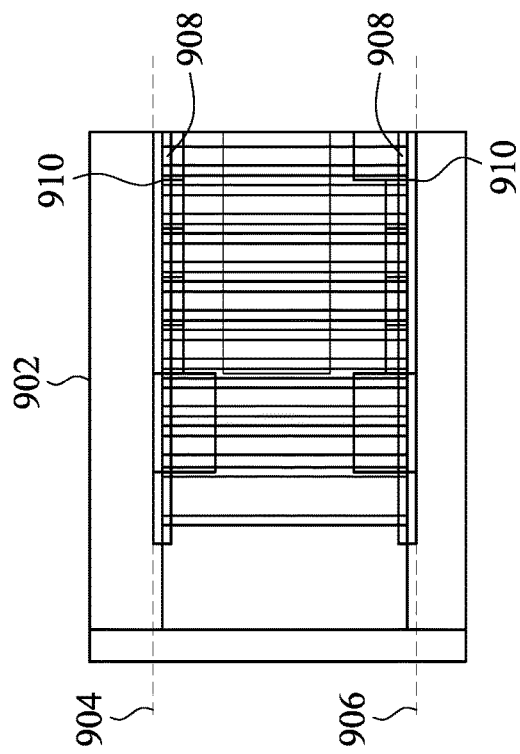
FIG. 9A
FIG. 9B
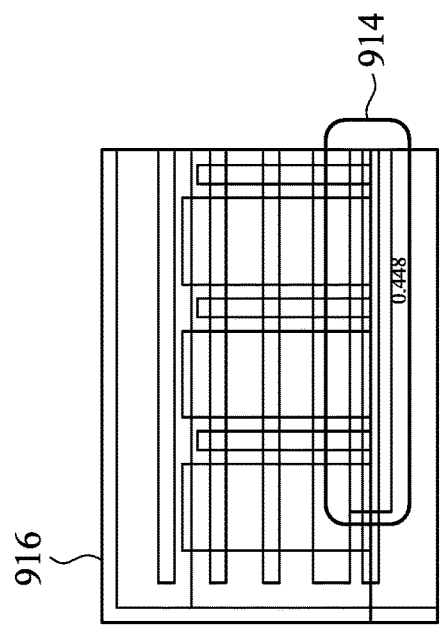
FIG. 9C
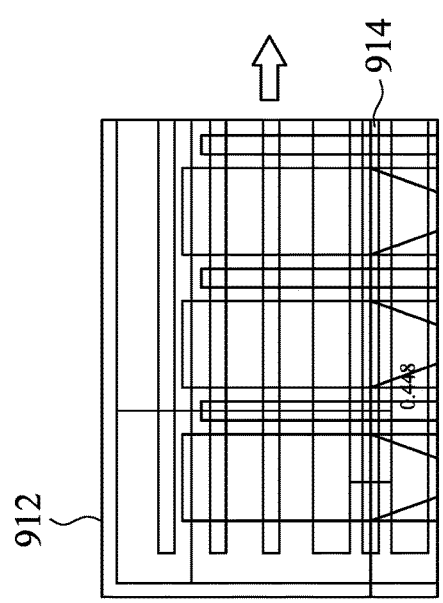
FIG. 9D

AUTOMATIC GENERATION OF SUB-CELLS FOR AN ANALOG INTEGRATED CIRCUIT

BACKGROUND

Over the last several decades the semiconductor fabrication industry has been driven by a continual demand for greater performance (e.g., increased processing speed, memory capacity, etc.), a shrinking form factor, extended battery life, and lower cost. In response to this demand, the industry has continually reduced a size of semiconductor device components, such that modern-day integrated circuit (IC) devices may comprise millions or billions of semiconductor devices arranged on a single semiconductor die.

As such, integrated circuits are enormously complicated. To ensure an IC functions properly and reliably, and can be produced with an acceptable yield, the design of the IC must meet certain constraints, or design rules. The design rules define various parameters for the IC. Example design rules include minimum widths for various components (e.g., wells, transistors), minimum spacing requirements, gate lengths, cell heights, and other geometric constraints.

Due to the complexity of the design and manufacturing processes, as well as market pressure to produce designs more rapidly, automated design tools are used extensively in the design process. However, some design processes still require manual operations, and some of these manual operations must be performed repeatedly due to design changes that occur during the design process.

BRIEF DESCRIPTION OF THE DRAWINGS

Aspects of the present disclosure are best understood by the following detailed description in conjunction with the accompanying drawings, where like reference numerals designate like structural elements. It is noted that various features in the drawings are not drawn to scale. In fact, the dimensions of the various features may be arbitrarily increased or reduced for clarity of discussion.

FIG. 5 depicts the operations in blocks 204 and 206 shown in FIG. 2 in accordance with some embodiments;

FIGS. 8A-8D illustrate an example second sub-cell request in accordance with some embodiments;

FIGS. 9A-9D depict an example third sub-cell request in accordance with some embodiments;

DETAILED DESCRIPTION

Figure 1:
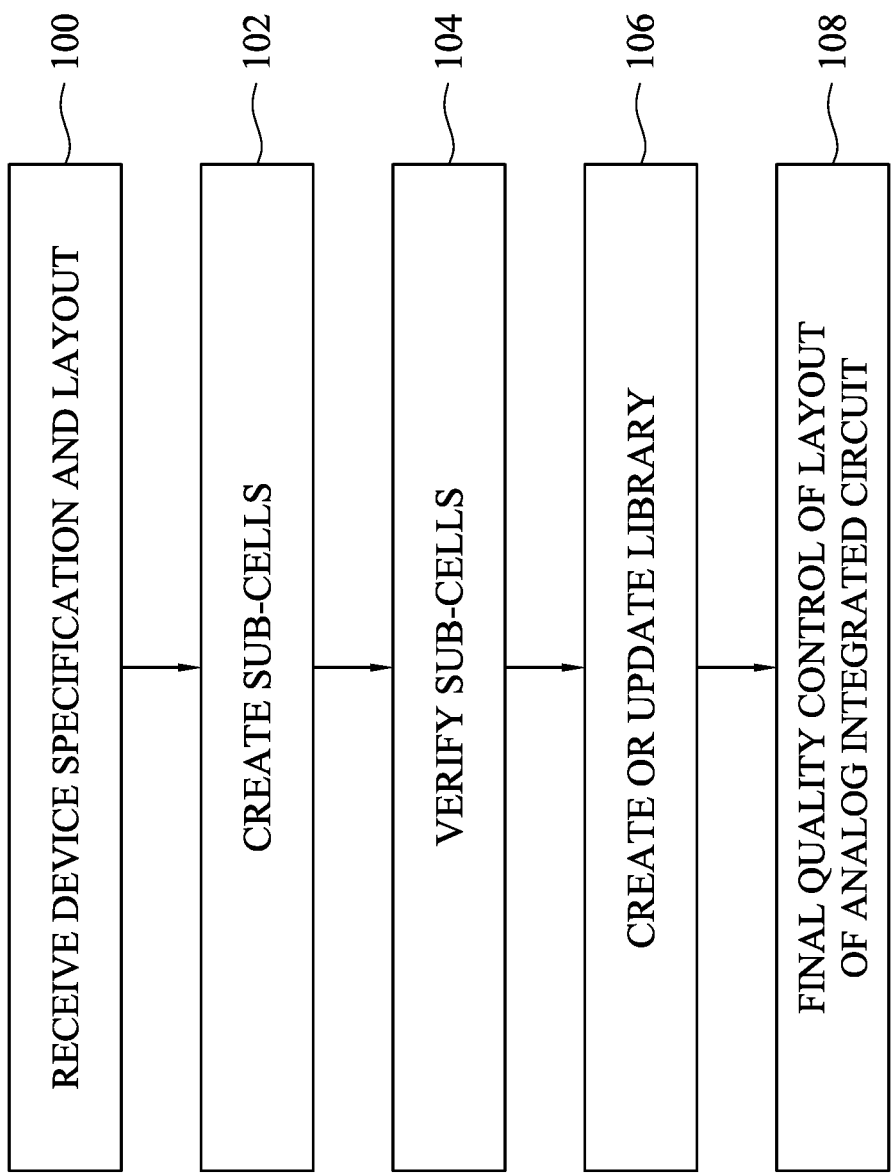
FIG. 1 depicts a flowchart of an example design process in accordance with some embodiments.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "over," "under", "upper," "top," "bottom," "front," "back," and the like, may be used herein for ease of description to describe one element or feature's relationship to another element(s) or feature(s) as illustrated in the Figure(s). The spatially relative terms are intended to encompass different orientations of the device in use or operation in addition to the orientation depicted in the figures. Because components in various embodiments can be positioned in a number of different orientations, the directional terminology is used for purposes of illustration only and is in no way limiting. When used in conjunction with layers of an integrated circuit, semiconductor device, or electronic device, the directional terminology is intended to be construed broadly, and therefore should not be interpreted to preclude the presence of one or more intervening layers or other intervening features or elements. Thus, a given layer that is described herein as being formed on, over, or under, or disposed on, over, or under another layer may be separated from the latter layer by one or more additional layers.

Embodiments disclosed herein provide techniques for automatically generating sub-cells for a non-final layout of an integrated circuit. The integrated circuit is typically constructed using cells, where a cell can contain some or all of a circuit or a component. An analog cell is a cell in which some or all of the cell includes an analog circuit or analog component. An analog cell is also known as a Pcell (parameterized cell) in which one or more parameters of the analog cell are definable (e.g., parameter values can vary). In one embodiment, some or all of the cells in a non-final layout of an integrated circuit is constructed with analog cells.

Embodiments disclosed herein are directed at techniques for partitioning an analog cell into sub-cells. Partitioning is a process that decomposes the layout of the analog cell into smaller sub-circuits or "sub-cells". A non-final layout of an analog integrated circuit or an analog cell is partitioned into sub-cells. The partitioned sub-cells can be verified by performing design rule checking (DRC), layout vs. schematic (LVS) verification, and/or layout vs. layout (LVL) verification. The automated processes reduce the amount of time that is needed to produce the sub-cells, particularly in situations where the non-final layout of the integrated circuit and/or the design rules change frequently. In some embodiments, verified sub-cells are included in a library that may be part of a process design kit that can be used in a subsequent design of an integrated circuit.

These and other embodiments are discussed below with reference to FIGS. 1-13. However, those skilled in the art will readily appreciate that the detailed description given herein with respect to these Figures is for explanatory purposes only and should not be construed as limiting.

FIG. 1 depicts a flowchart of an example design process in accordance with some embodiments. Although FIG. 1 is described in conjunction with an analog integrated circuit, the process can be used for analog cells in other embodiments. Initially, as shown in block 100, a device specification for an analog integrated circuit is received. The device specification defines one or more of the parameters of the analog integrated circuit. Example parameters include, but are not limited to, cell type(s), minimum widths for various components (e.g., wells, transistors), minimum spacing requirements, gate lengths, cell heights, number of fins (nfin), number of fingers (e.g., number of transistors), and other geometric constraints.

Next, as shown in block 102, sub-cells are generated based on the device specification. Each sub-cell is a smaller circuit or component of the analog integrated circuit. In one embodiment, ail of the sub-cells constitute the analog integrated circuit. An example process of generating the sub-cells is described in more detail in conjunction with FIGS. 2-4C. The sub-cells are then verified at block 104. In one embodiment, verification of the sub-cells includes one or more of DRC, LVS verification, and LVL verification.

Once the sub-cells are verified, a library of the sub-cells is created, or an existing library is updated with the verified sub-cells (block 106). The sub-cell library can be used in the development and design of other integrated circuits and/or analog cells. The final layout of the analog integrated circuit is then examined and/or tested for quality control and manufacturability at block 108.

Figure 2:
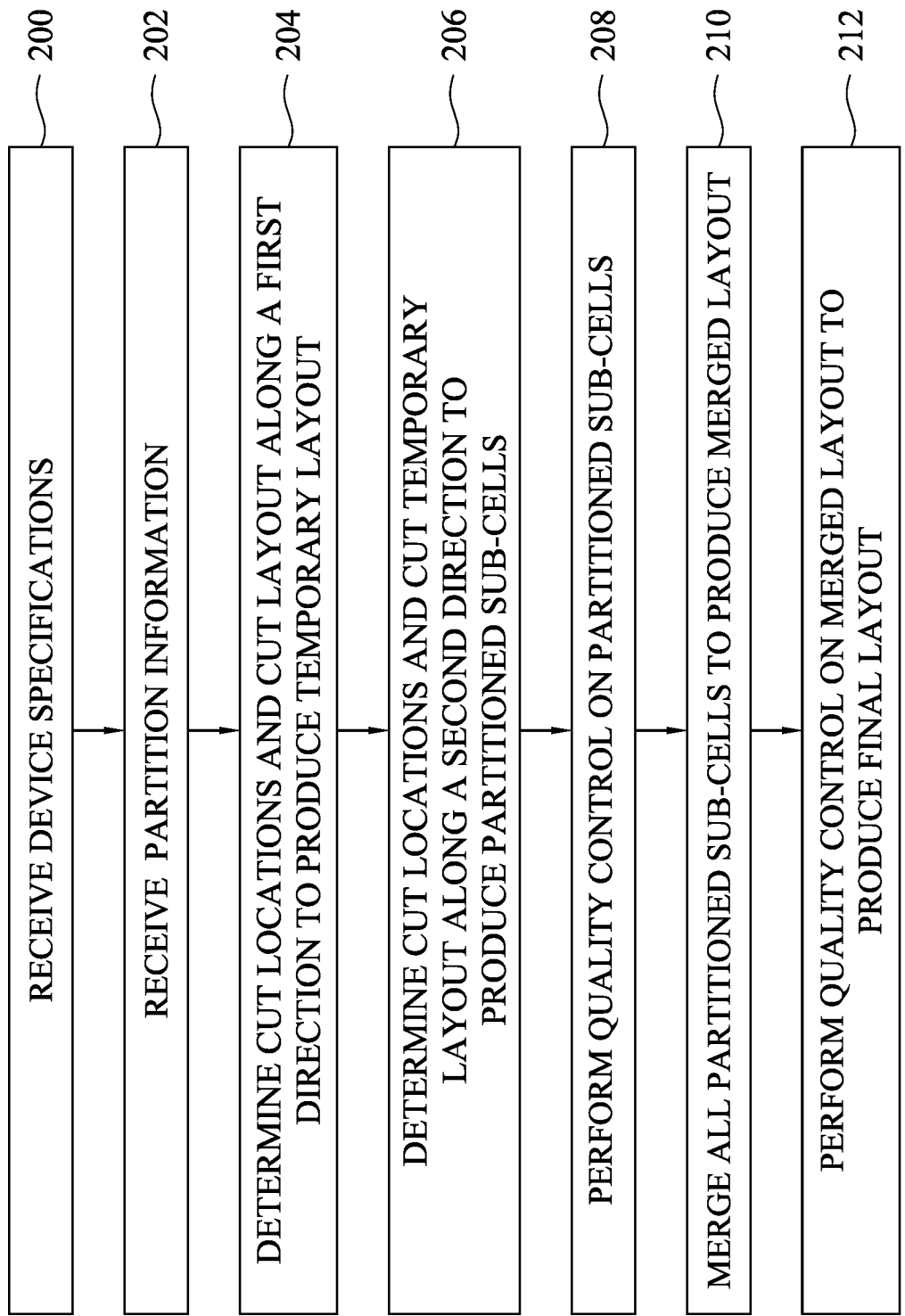
FIG. 2 illustrates a flowchart of an example method of generating sub-cells in accordance with some embodiments.

FIG. 2 illustrates a flowchart of an example method of generating sub-cells in accordance with some embodiments. Although FIG. 2 is described in conjunction with an analog integrated circuit, the process can be used for analog cells in other embodiments. Initially, as shown in block 200, data on the layout of the analog integrated circuit is received. The data includes the layout of the analog integrated circuit, and some or all of the information in the device specification (see block 100 in FIG. 1). For example, the information sets parameters such as cell type(s), gate length, nfin number, spacing minimums, and the like. In one example embodiment, the data is contained in a graphic design system (gds) file that is created by computer aided design software.

Next, as shown in block 202, partition information for the layout of the analog cell is received. The partition information relates to the partitioning of the sub-cells in the layout. The partition information can include information such as cell name (e.g., cell type), cut locations/distances for one direction, and cut locations/distances for another direction. In one embodiment, the partition information is stored in a file that is received by a computing system that partitions the layout (see e.g., FIGS. 11 and 12). A text file is an example of a file that is received at block 202. A user interface can be provided on a display of the computing system that presents a mechanism or input element(s) to submit the partition information. Additionally, the user interface allows the partition information to be modified quickly and easily. An example user interface is described in more detail in conjunction with FIG. 3.

When the layout of the analog integrated circuit is partitioned, the cut location or locations is determined and the layout is cut along a first direction at the one or more determined locations to produce a temporary layout (block 204). At block 206, one or more other cut locations are determined and cuts are made in the temporary layout along a second direction at the one or more determined locations to produce partitioned sub-cells. In one embodiment, the first direction is horizontal direction (e.g., x direction) and the second direction is a vertical direction (e.g., y direction), and each cut is specified by a starting point and an ending point (e.g., specifying a distance of the cut). The data for the cuts can be saved prior to, or after the partitioning operation. Table 1 provides a non-limiting example of the partition information that defines the cuts to be made in a layout.

TABLE 1

| Name | Xrange Start | Xrange End | Yrange Start | Yrange End |
|---|---|---|---|---|
| Sub-cell 1 | 0 | 0.51 | 0 | −0.28 |
| Sub-cell 2 | 0.51 | 1.02 | 0 | −0.28 |
| Sub-cell 3 | 1.02 | 1.53 | 0 | −0.28 |

Next, as shown in block 208, quality control operations are performed on the partitioned sub-cells. The quality control processes include, but are not limited to, one or more of DRC, LVS verification, and LVL verification. The partitioned sub-cells are then merged to produce a merged layout for the analog integrated circuit (block 210). Essentially, merging the sub-cells constructs or re-forms the layout of the analog integrated circuit. The merged layout is examined and/or tested for quality control and manufacturability at block 212 to produce a final layout for the analog integrated circuit.

Figure 3:
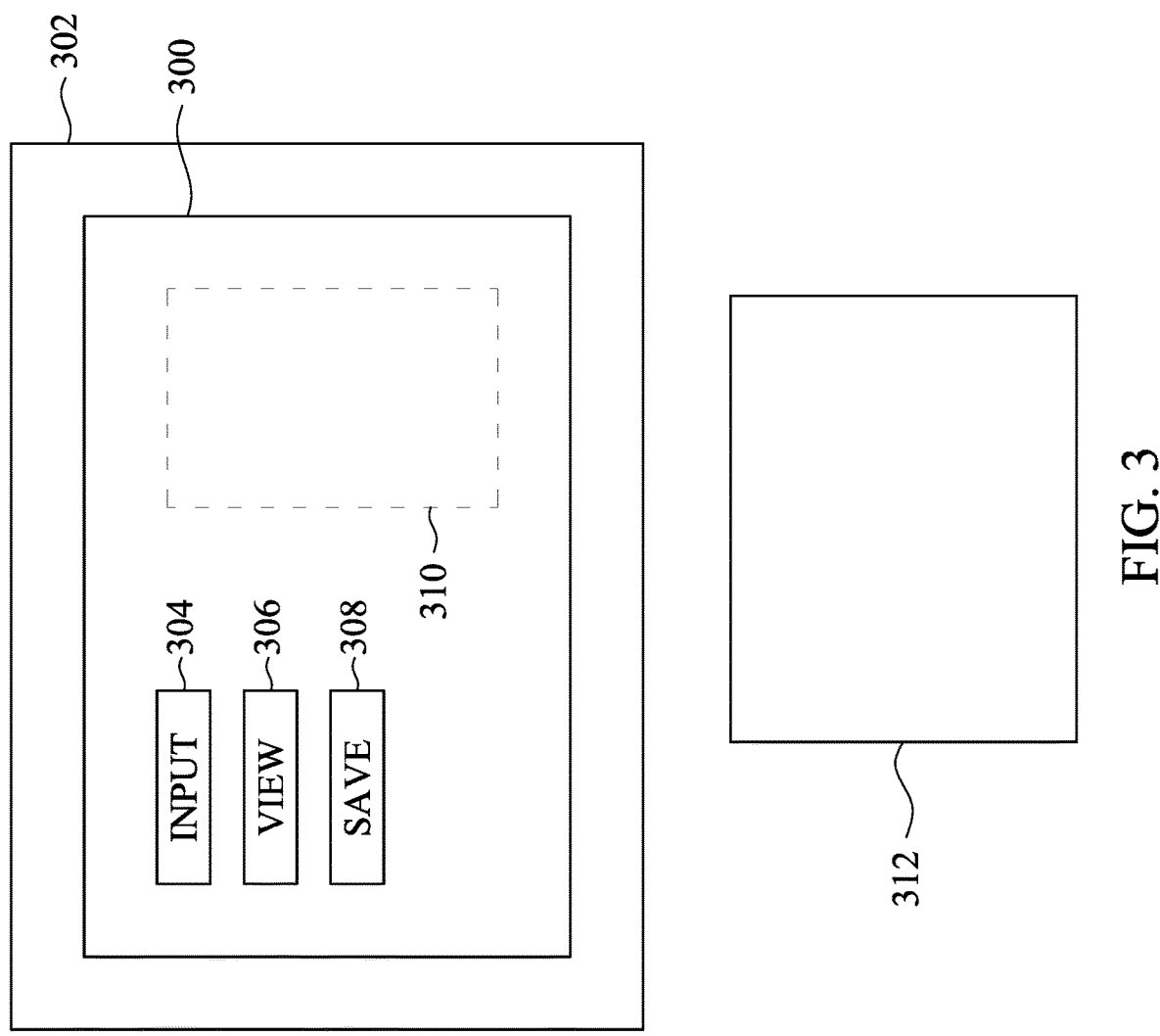
FIG. 3 depicts an example user interface that can be used to receive the device specifications and/or the device layout in accordance with some embodiments.

FIG. 3 depicts an example user interface that can be used to receive the device specifications and/or the device layout in accordance with some embodiments. In one embodiment, the device specification and the device layout are received at block 100 in FIG. 1 and the device specification is input at block 200 in FIG. 2. An example user interface 300 is displayed on a display 302 of a computing device (e.g., computing system 1100 in FIG. 11). The user interface 300 includes an input element 304, a view element 306, and a save element 308. The input element 304 enables a user to input information, such as the device layout and the device specification, to a computer assisted design program or an automated design tool (e.g., instructions 1106 in FIG. 11). The input element 304 can be implemented as any suitable input element that allows a user to input or submit information to a computing system. For example, the input element 304 can be a drop down menu that enables the user to select a file to input (e.g., upload), a list box, a text box, or an input area where a user can drag and drop the information to be submitted.

The user can view the submitted information by selecting or activating the view element 306. In response to activating the view element 306, the information can be displayed in a panel 310 within the user interface 300. Alternatively, the information may be presented in a panel 312 that is separate from the user interface 300 (e.g., another user interface view). In some embodiments, the user can modify or edit the information displayed in the panel 310 or the panel 312. After editing the information, the user can save the information to a storage device by selecting or activating the save element 308.

Other embodiments can include additional elements in the user interface. For example, a user interface can include a delete element that deletes a selected section of the information or all of the information. Additionally or alternatively, the user interface may include a send element that enables a user to send the information to the computing device that partitions the analog integrated circuit and/or to another user.

Figure 4C:
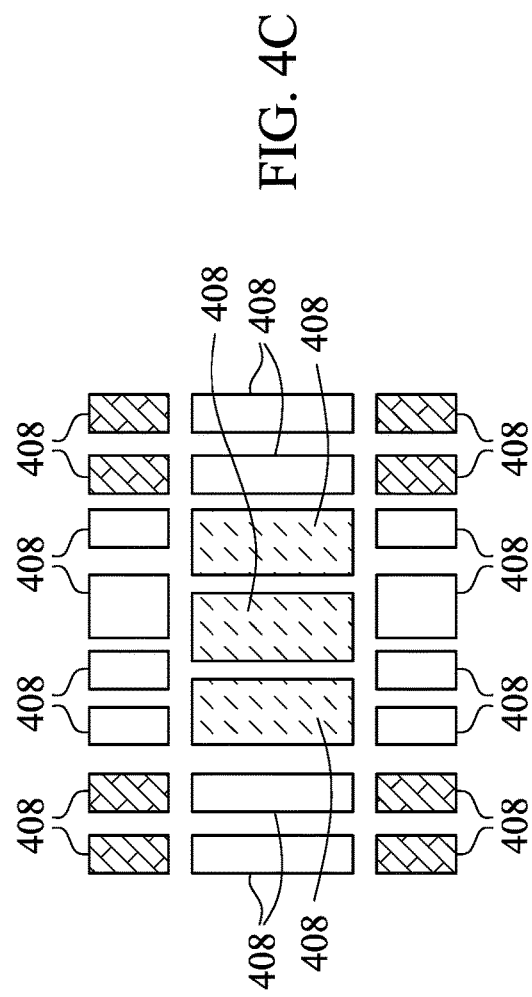
FIGS. 4A-4C illustrate the operations in blocks 204 and 206 shown in FIG. 2 in accordance with some embodiments.
Figure 4B:
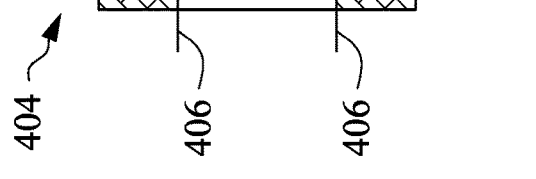
Figure 4A:
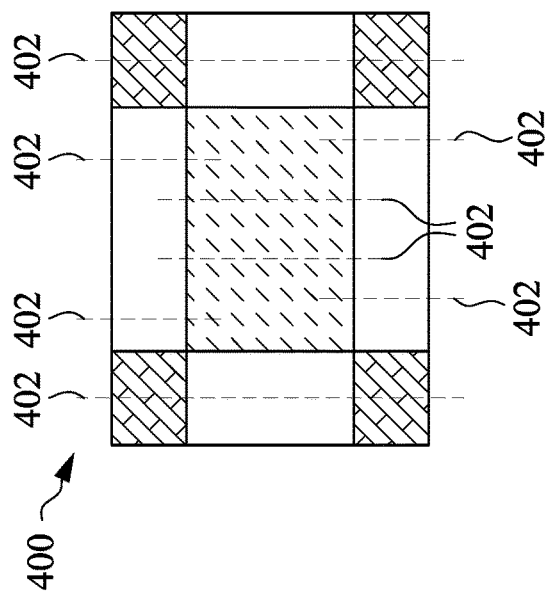

FIGS. 4A-4C illustrate the operations in blocks 204 and 206 shown in FIG. 2 in accordance with some embodiments. Although FIGS. 4A-4C are described in conjunction with an analog integrated circuit, the process can be used for analog cells in other embodiments. The layout 400 corresponds to the non-final layout of the analog integrated circuit. The partition information defines the sub-cell names (e.g., cell type) and the starting and ending points for the cuts to be made in the layout 400 (see e.g., Table 1).

FIG. 4A shows a first set of cuts 402 made along a first direction. The first set of cuts 402 are represented by the dashed lines. The first set of cuts 402 can include any number of cuts. In the illustrated embodiment, the first set of cuts includes eight cuts that are made along the y direction. The first set of cuts 402 are made at various locations in the layout 400. A temporary layout 404 is produced after the first set of cuts 402 are formed.

FIG. 4B shows a second set of cuts 406 (represented by solid lines) made along the second direction (e.g., x direction) in the temporary layout 404. The second set of cuts 406 can include any number of cuts. In one embodiment, the CAD layer and the boundary of a fin are determined prior to forming the second set of cuts 406. In FIG. 4B, the second set of cuts 406 includes two cuts 406. Multiple sub-cells 408 are produced from the layout 400 after the second set of cuts 406 are formed (see FIG. 4C).

FIG. 5 depicts the operations in blocks 204 and 206 shown in FIG. 2 in accordance with some embodiments. The layout 400 (FIG. 4A) is shown in more detail. The layout 400 includes a first active diffusion region 500, a second active diffusion region 502, polysilicon ("poly") lines 504 disposed over the first and the second active diffusion regions 500, 502, and a metal layer 506 disposed over the first and the second diffusion regions 500, 502. Power lines 508, 510 provide one or more voltage sources (e.g., VDD and VSS, respectively). Contacts 512a are made to the metal layer and contacts 512b are also made to the poly lines 504.

The first set of cuts 402 and the second set of cuts 406 are shown in the layout 400. In one embodiment, the first set of cuts 402 and the second set of cuts 406 are defined by starting and ending points (e.g., see Table 1). A first sub-cell 514, a second sub-cell 516, and a third sub-cell 518 are produced by the first and the second cuts 402, 406. Although only three sub-cells 514, 516, 518 are shown, any number of sub-cells can be generated in other embodiments.

In one example embodiment, the cell types for the non-final layout include Boundary Corner (BC), Boundary Vertical (BV), Boundary Horizontal (BH), TAP, and Active (ACT). The cell types can be defined with any suitable definition. In the example embodiment, the BC cell type is defined as two rows and one row composed of 6~10 poly lines. The BV cell type is defined as sixteen rows and one row composed of 6~10 poly lines. The BH cell type is defined as two rows and one row composed of 58~76 poly lines. The TAP cell type is defined as sixteen rows and one row composed of 6~10 poly lines. The ACT cell type is defined of sixteen by two (16×2) rows, one row composed of 8~10 poly lines (polysilicon on OD edge or PODE), 10~13 poly lines (ACT), and 8~10 poly lines (PODE).

Continuing with the example embodiment, the cell types for the sub-cells include Boundary Guarding Corner (BGC), Boundary Guarding Vertical (BGV), Boundary Guarding Horizontal (BGH), TAP, CP280 (PMOS with a specified cell height (an example cell height of 280 is shown)), and CN280 (NMOS with a specified cell height (example cell height of 280)). The BGC sub-cell type is defined as P/N cells with 6~10 poly lines. The BGV sub-cell type is defined as P/N cells with 6~10 poly lines. The BGH sub-cell type is defined as P/N cells with BGHd (Boundary Guarding Horizontal edge) with one poly line, BGHi (Boundary Guarding Horizontal with PODE layer in GGH) with one poly line, and BGHf (Boundary Guarding Horizontal that can be set as multi-poly) with one or more poly lines. The TAP sub-cell type is defined as P/N cells with 6~10 poly lines. The CP280 sub-cell type is defined as P cells with PODEd (polysilicon on OD edge of ACT that connects to BGV), PODE, CNOD (continuous oxide diffusion), and ACT. The PODEd has one poly line, the PODE has one poly edge OD, the CNOD has one poly line without PODE, and the ACT has one poly line. The CN280 sub-cell type is defined as N cells with PODEd, PODE, CNOD, and ACT (the same as with the CP280 sub-cell type). Other embodiments are not limited to these definitions of the cell types and the sub-cell types. The cell types and the sub-cell types can be defined with any suitable definition.

Figure 6:
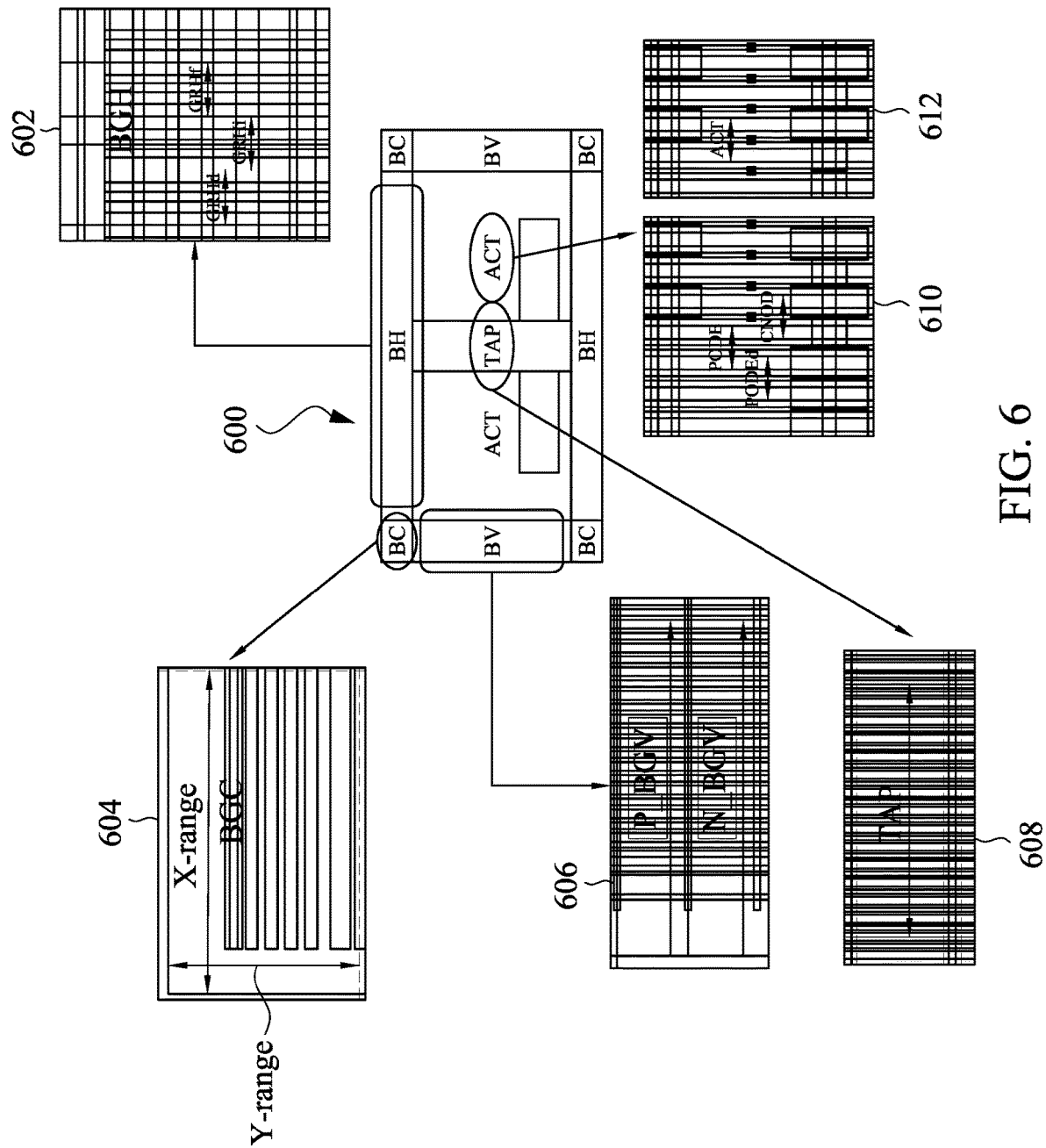
FIG. 6 illustrates an example partition of a layout in accordance with some embodiments.

FIG. 6 illustrates an example partition of a layout in accordance with some embodiments. As shown, the non-final layout 600 of an integrated circuit includes four BC cell types at the corners of the non-final layout 600, two BH cell types at the top and bottom edges of the non-final layout 600 (between the BC cell types), and two BV cell types at each side edge (e.g., left and right edges) of the non-final layout 600 (between the BC cell types). A TAP cell type is disposed between two ACT cell types in the center of the non-final layout 600 (between the BC, BH, and BV cell types).

The non-final layout 600 is partitioned into six sub-cells 602, 604, 606, 608, 610, 612. Sub-cell 602 is a BGH sub-cell type that is partitioned from the top BH cell type. Sub-cell 604 is a BGC sub-cell type that is partitioned from the BC cell type positioned at the upper left corner of the non-final layout 600. Sub-cell 606 is a BGV sub-cell type that is partitioned from the BV cell type positioned at the left side of the non-final layout 600. The sub-cell 606 includes a p-type region (P_BGV) and an n-type region (N_BGV).

Sub-cell 608 is a TAP sub-cell type that is partitioned from the TAP cell type positioned between the two ACT cell types and the top and bottom BH cell types in the non-final layout 600. Sub-cells 610, 612 are ACT sub-cell types that are partitioned from the ACT cell type positioned between the TAP cell type and the right-side BV cell type. The sub-cell 610 includes the PODEd, PODE, and CNOD. The sub-cell 612 includes the ACT. Other embodiments are not limited to the layout, the cell types, and sub-cell types shown in FIG. 6. Any suitable layout, cell types, and sub-cell types can be used in other embodiments.

Figure 7A:
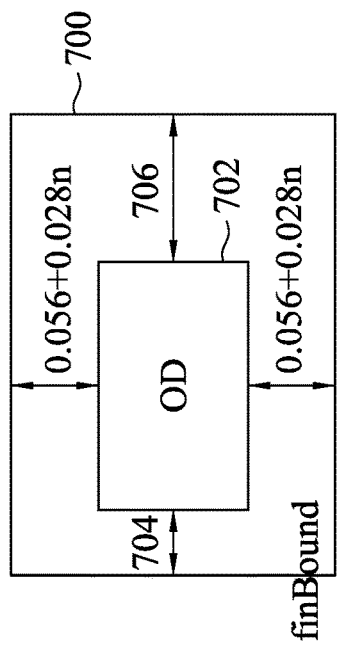
FIGS. 7A-7C depict an example first sub-cell request in accordance with some embodiments.
Figure 7C:
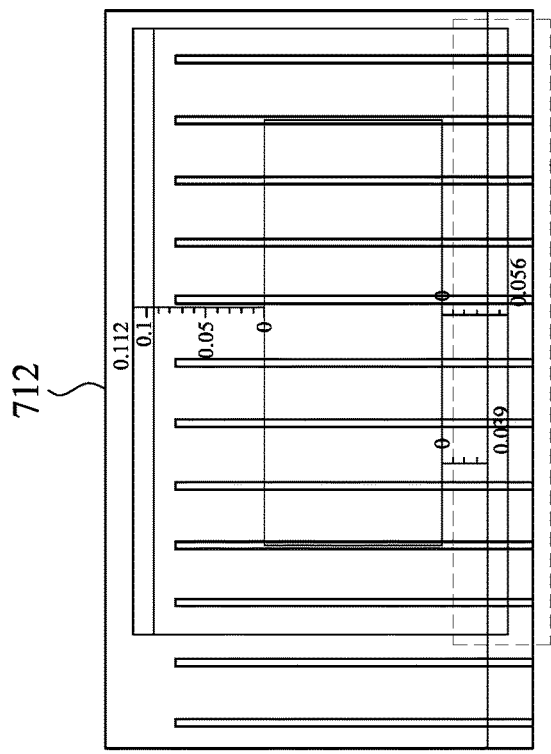
Figure 7B:
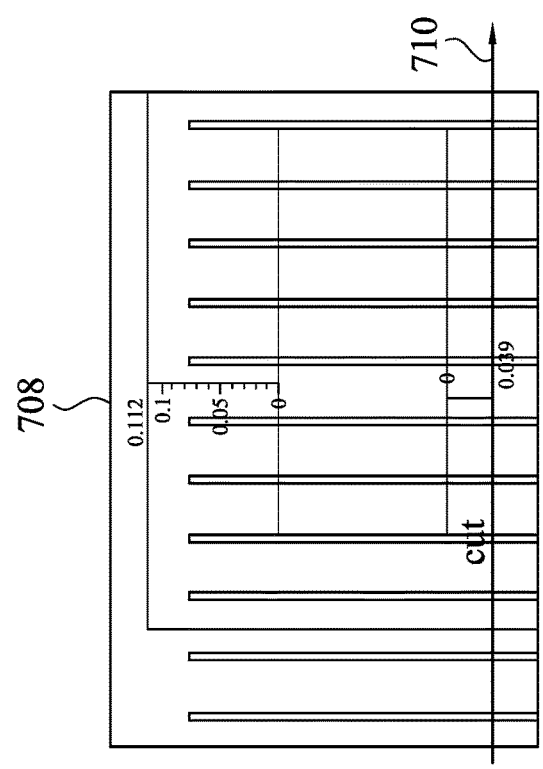

FIGS. 7A-7C depict an example first sub-cell request in accordance with some embodiments. A sub-cell request is a request to cut a sub-cell from the top cell (e.g., the analog integrated circuit layout). Every sub-cell needs a grid for a process design kit (PDK). An active diffusion region (e.g., an oxide diffusion (OD) region) has a fin boundary enclosure requirement. In the illustrated embodiment, the fin boundary enclosure requirement is defined by the equation $0.056+0.028*n$. The fin boundary enclosure equation is based on a design rule manual for the analog IC, and the variable "n" is a number equal to or greater than zero. The value of the variable "n" is set to produce a given size for the active diffusion region. Other embodiments can define the fin boundary enclosure requirement with a different equation.

FIG. 7A shows the enclosure 700 with respect to the OD region 702. The enclosure 700 is not symmetrical with respect to the OD region 702 in that on one side (e.g., left side) of the OD region 702 the enclosure 700 extends an extension or distance 704 from the OD region 702 and on the opposite side (e.g., right side) of the OD region the enclosure 700 extends an extension 706 from the OD region 702, where 706 is greater than 704. The extension 706 extends the fin boundary on that side of the OD region 702.

FIG. 7B shows an analog cell 708 of a layout with a cut 710 along a first direction (e.g., x direction). The sub-cell 712 formed from the analog cell 708 (FIG. 7C) has an extended fin boundary 714. In FIG. 7C, the extended fin boundary 714 is extended from 0.039 to 0.056. In other embodiments, the extended fin boundary 714 can be extended by any given extension or distance.

FIGS. 8A-8D illustrate an example second sub-cell request in accordance with some embodiments. The example presents two sub-cells in the horizontal direction (e.g., x direction). FIGS. 8A and 8B show the two sub-cells 800, 802 with the cut metal-to-diffusion (MD) layer (CMD) enabled. When each sub-cell 800, 802 passes a design rule check, the two sub-cells 800, 802 can abut each other in the layout 804 (see FIG. 8B).

FIGS. 8C and 8D depict a sub-cell 806 with the CMD disabled and a sub-cell 808 with the CMD enabled. When the CMD for the sub-cell 808 is disabled and the two sub-cells 806, 808 abut one another, in some instances the disabled CMD can produce a CMD DRC error (DRC error highlighted in circled area 810 in FIG. 8C). Accordingly, the length of the CMD length for the sub-cell 808 is extended (see FIG. 8D) so the end location of the CMD is positioned between two MD layers (e.g., in the middle between the two MD layers).

FIGS. 9A-9D depict an example third sub-cell request in accordance with some embodiments. The polysilicon lines in an integrated circuit can have different lengths, also known as gate lengths. For example, the gate lengths can be six (6) nanometers nm), twenty (20) nm, thirty-six (36) nm, and fifty-four (54) nm. In some embodiments, one or more CMD locations align with the end of a cut PO (polysilicon) layer (CPO) based on a particular gate length (e.g., 6 nm).

FIGS. 9A and 9B presents an embodiment where the CMD location is aligned with an end of a CPO. In the illustrated embodiment, the CMD is in the vertical direction (e.g., y direction). As noted previously, for particular gate lengths, the CMD location aligns with the end of a CPO. For example, FIG. 9A depicts an analog cell 900, and FIG. 9B shows a sub-cell 902 that is produced as a result of partitioning the analog cell 900. The dashed lines 904, 906 show the location 908 of the CMD is aligned with the end 910 of the CPO.

In other embodiments, based on the gate length, the CMD location in the analog cell is maintained in a sub-cell. For example, the CMD location may be maintained when the gate length is 20 nm or 54 nm. FIG. 9C illustrates an analog cell 912 that is a BC cell type. The CMD is positioned at location 914 in the analog cell. When the analog cell 900 is partitioned to generate sub-cell 916, the position of the CMD is maintained at location 914.

Figure 10A:
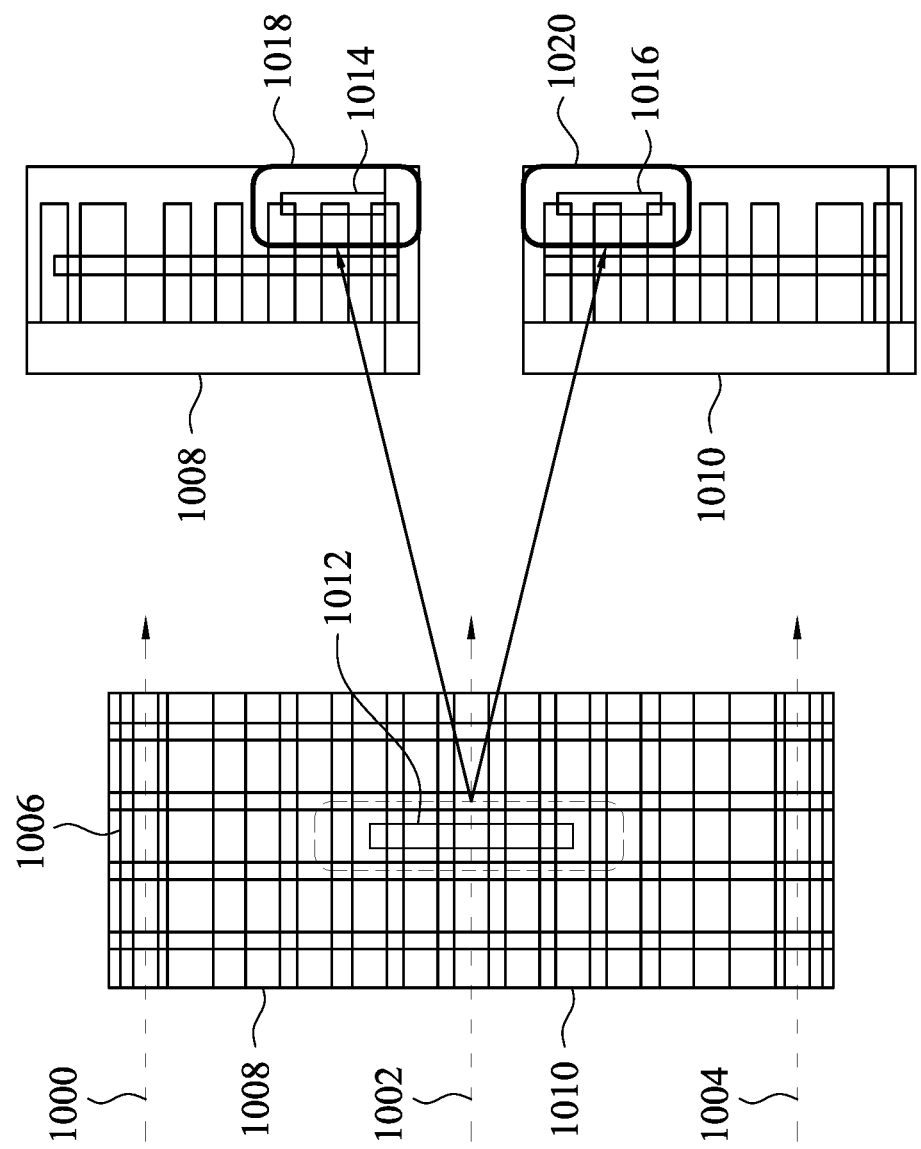
FIGS. 10A-10B illustrate an example fourth sub-cell request in accordance with some embodiments.
Figure 10B:
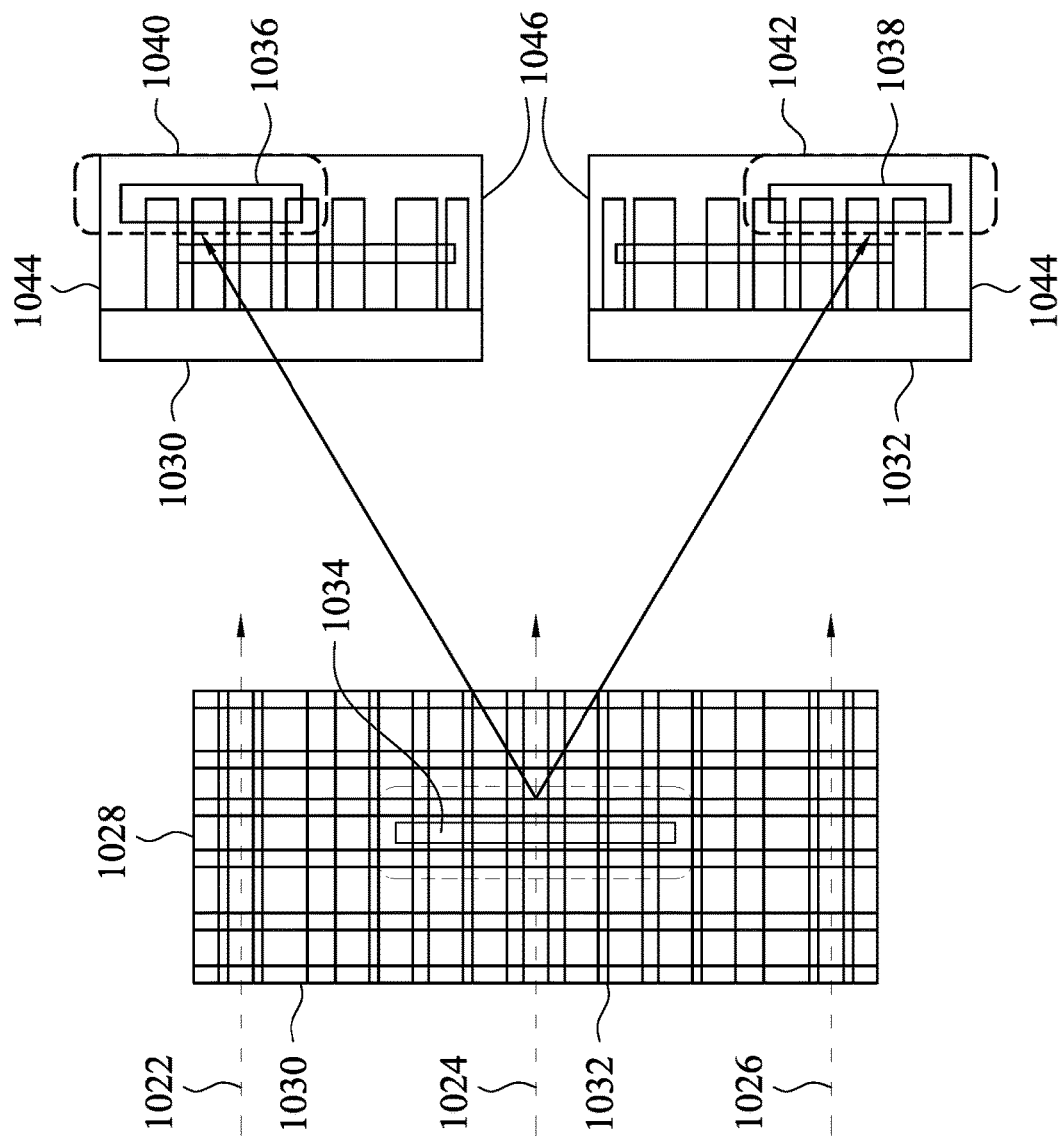

FIGS. 10A-10B illustrate an example fourth sub-cell request in accordance with some embodiments. The locations for the cut metal layer 0 (M0) differ in the illustrated embodiment. FIG. 10A shows the location for the cut color A of M0 (CM0A), while FIG. 10B shows the location for the cut color B of M0 (CM0B). In FIG. 10A, cuts 1000, 1002, 1004 are made along one direction (e.g., they direction) in the layout 1006 of an analog cell. The cuts 1000, 1002, 1004 produce sub-cell 1008 and sub-cell 1010. The cut 1002 cuts the metal stripe 1012 such that a first section 1014 of the metal stripe 1012 in the M0 layer is located in the sub-cell 1008 and a second section 1016 of the metal stripe 1012 is located in the sub-cell 1010. As shown, the location 1018 in the sub-cell 1008 corresponds to the location of the metal stripe 1012 in the analog cell, and the location 1020 in the sub-cell 1010 corresponds to the location of the metal stripe 1012 in the analog cell. The locations 1018, 1020 are immediately adjacent the cut 1002.

The locations 1040, 1042 of the first and the second sections 1036, 1038 of the metal stripe 1034 in FIG. 10B differ from the locations 1018, 1020 in FIG. 10A. In one embodiment, the locations 1040, 1042 differ from the locations 1018, 1020 based on a DRC rule. In FIG. 10B, cuts 1022, 1024, 1026 are made along one direction (e.g., the y direction) in the layout 1028 of an analog cell. The cuts 1022, 1024, 1026 produce sub-cell 1030 and sub-cell 1032. The cut 1024 cuts the metal stripe 1034 in the M0 layer such that a first part 1036 of the metal stripe 1034 is located in the sub-cell 1030 and a second part 1038 of the metal stripe 1034 is located in the sub-cell 1032. As shown, the location 1040 in the sub-cell 1030 corresponds to the location 1020 in FIG. 10A, and the location 1042 in the sub-cell 1032 corresponds to the location 1018 in FIG. 10A. The locations 1040, 1042 are not immediately adjacent the cut 1024. Instead, the locations 1040, 1042 are positioned at the edges 1044 of the sub-cells 1030, 1032 that are opposite the edges 1046 immediately adjacent the cut 1024.

In some embodiments, a design for an analog integrated circuit is provided by a computer system such as an Electronic Computer-Aided Design (ECAD) system. ECAD tools and methods facilitate the design, partition, and placement of circuits and/or components in an analog integrated circuit on a semiconductor substrate (or other suitable substrate). The ECAD process typically includes turning a behavioral description of an analog integrated circuit into a functional description, which is then decomposed into logic functions and mapped into cells that implement the logic or other electronic functions. As described earlier, such cells may be defined and stored in a cell library. Once mapped, a synthesis is performed to turn the structural design into a physical layout. In some instances, the design may be optimized post layout.

Figure 11:
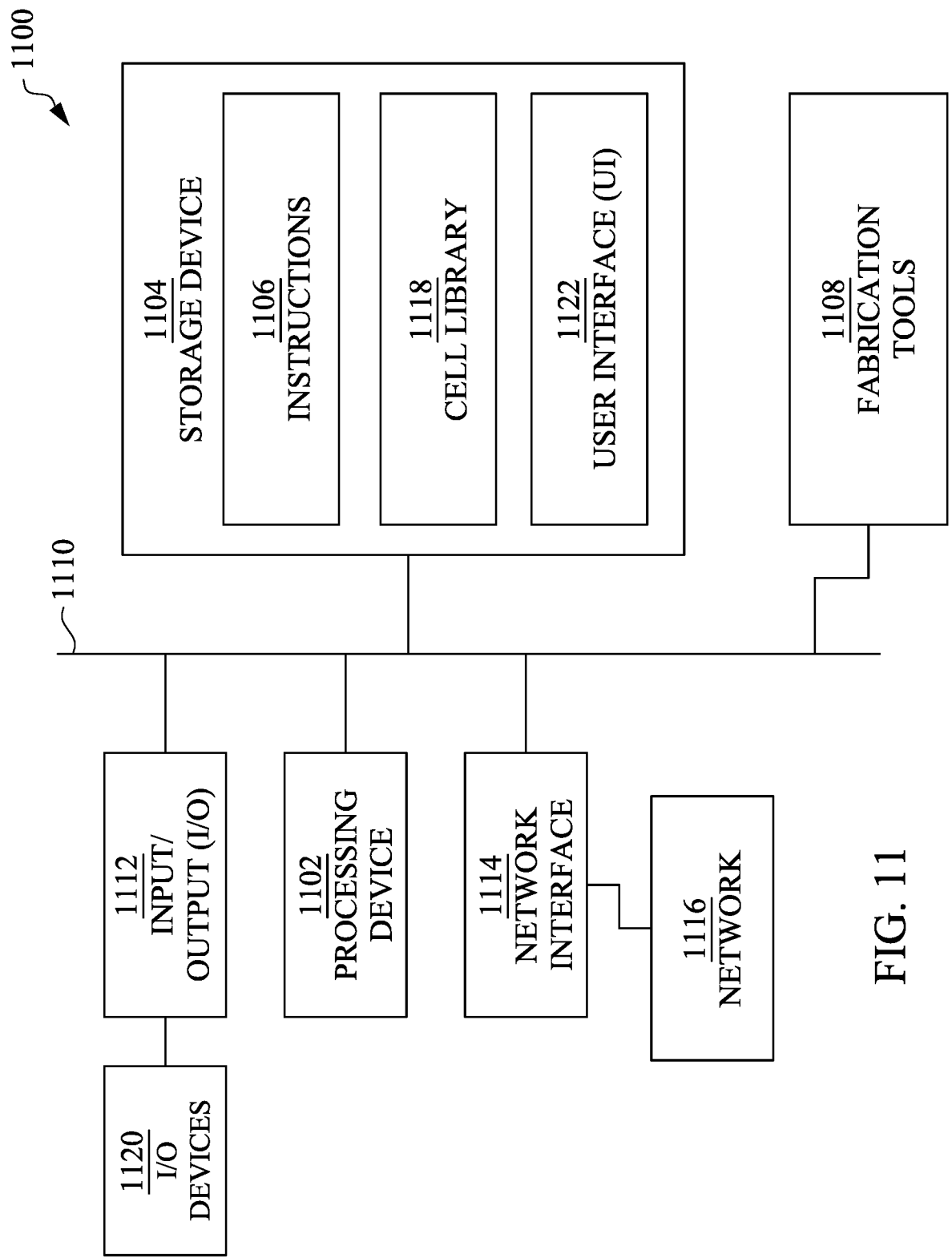
FIG. 11 depicts an example system that is suitable for generating sub-cells and designing an integrated circuit in accordance with some embodiments.

FIG. 11 depicts an example system that is suitable for generating sub-cells and designing an integrated circuit in accordance with some embodiments. The design process may be implemented by a computer system, such as an ECAD system. Some or all of the operations for design (e.g., layout) methods disclosed herein are capable of being performed as part of a design procedure performed in a design house, such as the design house 1302 discussed below in conjunction with FIG. 13.

In some embodiments, the system 1100 includes an automated place and route (APR) system. In some embodiments, the system 1100 includes a processing device 1102 and a non-transitory, computer-readable storage medium 1104 ("storage device"). The processing device 1102 is any suitable processing device or processing devices. Example processing devices include, but are not limited to, a central processing unit, a microprocessor, a distributed processing system, an application specific integrated circuit, a graphics processing unit, a field programmable gate array, or combinations thereof.

The storage device 1104 may be encoded with or store, for example, computer program code (e.g., a set of executable instructions 1106). Execution of the executable instructions 1106 by the processing device 1102 represents (at least in part) an ECAD tool that implements a portion or all of, the methods described herein to produce the designs for the structures and the ICs disclosed herein. Further, the fabrication tools 1108 may be included for layout and physical implementation of the ICs. In one or more embodiments, the storage device 1104 is a non-transitory electronic, magnetic, optical, electromagnetic, infrared, and/or a semiconductor system (or apparatus or device). For example, the storage device 1104 includes a semiconductor or solid-state memory, a magnetic tape, a removable computer diskette, a random-access memory (RAM), a read-only memory (ROM), a rigid magnetic disk, and/or an optical disk. In one or more embodiments using optical disks, the storage device 1104 includes a compact disk-read only memory (CD-ROM), a compact disk-read/write (CD-R/W), and/or a digital video disc (DVD).

The processing device 1102 is operably connected to the storage device 1104 via a bus 1110. The processing device 1102 is also operably connected to an input/output (I/O) interface 1112 and a network interface 1114 by the bus 1110. The network interface 1114 is operably connected to a network 1116 so that the processing device 1102 and the storage device 1104 are capable of connecting to external elements via the network 1116. In one or more embodiments, the network 1116 is illustrative of any type of wired and/or wireless network, such as an intranet and/or a distributed computing network (e.g., the Internet).

The network interface 1114 allows the system 1100 to communicate with other computing or electronic devices (not shown) via the network 1116. The network interface 1114 includes wireless network interfaces and/or wired network interfaces. Example wireless network interfaces include BLUETOOTH, WIFI, WIMAX, GPRS, or WCDMA. Example wired network interfaces include ETHERNET, USB, or IEEE-1364. In one or more embodiments, some or all of the processes and/or methods disclosed herein are implemented in a distributed system via the network 1116.

The processing device 1102 is configured to execute the executable instructions 1106 encoded in the storage device 1104 to cause the system 1100 to be usable for performing some or all of the processes and/or methods described herein. For example, an electronic design application (e.g., in an ECAD system or as a standalone application) can be configured to perform the methods and techniques shown in FIGS. 1-10. Given the complexity of integrated circuits, and since integrated circuits include thousands, millions, or billions of components, the human mind is unable to perform the methods and techniques depicted in FIGS. 1-10. Unlike the human mind, an electronic design application is able to perform the operations associated with FIGS. 1-10.

In one or more embodiments, the storage device 1104 stores the executable instructions 1106 configured to cause the system 1100 to be usable for performing some or all of the processes and/or methods. In one or more embodiments, the storage device 1104 also stores information that facilitates execution of a portion of or all of the processes and/or methods. In one or more embodiments, the storage device 1104 stores a cell library 1118 that includes (at least in part) standard and/or previously designed cells.

The I/O interface 1112 is operably connected to I/O devices 1120. In one or more embodiments, the I/O devices 1120 include one or more of an image capture device, a microphone, a scanner, a keyboard, a keypad, a mouse, a trackpad, a touchscreen, and/or cursor direction keys for communicating information and commands to the processing device 1102. The I/O devices 1120 may also include one or more displays, one or more speakers, a printer, headphones, a haptic or tactile feedback device, and the like.

The system 1100 is configured to receive information through the I/O interface 1112. The information received through the I/O interface 1112 includes one or more of instructions, data, design rules, cell libraries, and/or other parameters for processing by the processing device 1102. The information is transferred to the processing device 1102 via the bus 1110. The system 1100 is configured to receive information related to a user interface (UI) through the I/O interface 1112. The information is stored in the storage device 1104 as a UI 1122 or for presentation in the UI 1122.

In some embodiments, a portion or all of the processes and/or methods is implemented as a standalone software application (e.g., an EDA) for execution by a processing device (e.g., processing device 1102). In some embodiments, a portion or all of the processes and/or methods is implemented as a software application that is a part of an additional software application. In some embodiments, a portion or all of the processes and/or methods is implemented as a plug-in to a software application. In some embodiments, at least one of the processes and/or methods is implemented as a software application that is a portion of an EDA tool. In some embodiments, a portion or all of the processes and/or methods is implemented as a software application that is used by the system 1100. In some embodiments, a layout diagram which includes standard and/or previously designed cells is generated using a tool such as VIRTUOSO available from CADENCE DESIGN SYSTEMS, Inc., or another suitable layout generating tool.

In some embodiments, the processes are realized as functions of a program stored in a non-transitory computer readable recording medium (e.g., the storage device 1104). Examples of a non-transitory computer readable recording medium include, but are not limited to, external/removable and/or internal/built-in storage or memory unit, e.g., one or more of an optical disk, such as a DVD, a magnetic disk, such as a hard disk, a semiconductor memory, such as a ROM, a RAM, a memory card, and the like.

As noted above, embodiments of the system 1100 may include the fabrication tools 1108 for implementing the processes and/or methods stored in the storage device 1104. For instance, a synthesis may be performed on a design in which the behavior and/or functions desired from the design are transformed to a functionally equivalent logic gate-level circuit description by matching the design to cells selected from the cell library 1118. The synthesis results in a functionally equivalent logic gate-level circuit description, such as a gate-level netlist. Based on the gate-level netlist, a photolithographic mask may be generated that is used to fabricate the analog integrated circuit by the fabrication tools 1108. Further aspects of device fabrication are disclosed in conjunction with FIG. 13, which is a block diagram of an integrated circuit manufacturing system, and a manufacturing flow associated therewith, in accordance with some embodiments. In some embodiments, based on a layout diagram, at least one of: (a) one or more semiconductor masks; or (b) at least one component in a layer of a semiconductor integrated circuit is fabricated using the manufacturing system 1300.

Figure 12:
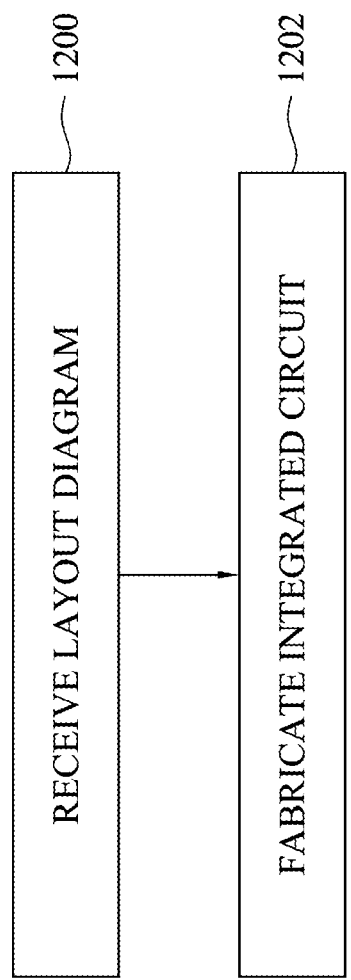
FIG. 12 illustrates a flowchart of an example method of fabricating an integrated circuit.

FIG. 12 illustrates a flowchart of an example method of fabricating an analog integrated circuit. Initially, as shown in block 1200, a layout diagram of an analog integrated circuit is received. In some embodiments, the layout diagram is generating using one or more operations shown in FIGS.

1-10. For example, the layout diagram can be the final layout diagram produced at block 212 in FIG. 2. Based on the received layout diagram, the analog integrated circuit is fabricated at block 1202.

Figure 13:
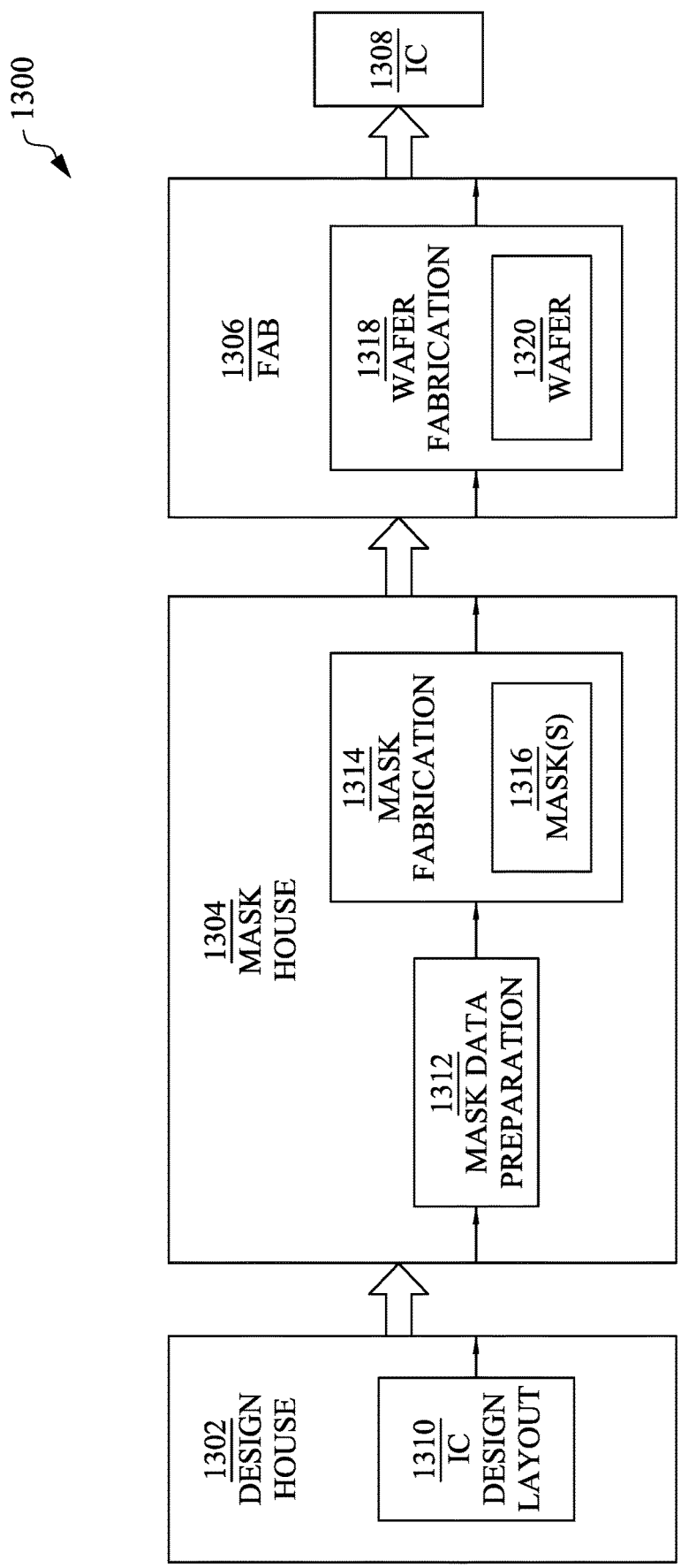
FIG. 13 depicts a block diagram of an example integrated circuit manufacturing system and manufacturing flow in accordance with some embodiments.

FIG. 13 depicts a block diagram of an example integrated circuit manufacturing system and manufacturing flow in accordance with some embodiments. The IC manufacturing system 1300 includes entities, such as a design house 1302, a mask house 1304, and an IC manufacturer/fabricator ("fab") 1306, that interact with one another in the design, development, and manufacturing cycles and/or services related to manufacturing an IC 1308, such as the ICs disclosed herein. The entities in the system 1300 are operably connected by a communication network (not shown). In some embodiments, the communication network is a single network. In other embodiments, the communication network is a variety of different networks, such as an intranet and the Internet. The communication network includes wired and/or wireless communication channels.

Each entity interacts with one or more of the other entities and provides services to and/or receives services from one or more of the other entities. In some embodiments, two or more of the design house 1302, the mask house 1304, and the IC fab 1306 is owned by a single company. In some embodiments, two or more of the design house 1302, the mask house 1304, and the IC fab 1306 coexist in a common facility and use common resources.

The design house (or design team) 1302 generates an IC design layout diagram 1310. The IC design layout diagram 1310 includes various geometrical patterns, or IC layout diagrams designed for the IC 1308 to be fabricated. The geometrical patterns correspond to patterns of metal, oxide, or semiconductor layers that make up the various components of the IC 1308 to be fabricated. The various layers combine to form various IC features. For example, a portion of the IC design layout diagram 1310 includes various IC features, such as active regions, gate electrodes, source and drain, conductive lines or local vias, and openings for bonding pads, to be formed in a semiconductor substrate (such as a silicon wafer) and various material layers disposed on the semiconductor substrate.

The design house 1302 implements a design procedure to form the IC design layout diagram 1310. The design procedure includes one or more of logic design, physical design or place and route. The IC design layout diagram 1310 is presented in one or more data files having information of the geometrical patterns. For example, the IC design layout diagram 1310 can be expressed in a GDS file format, a GDSII file format, or a DFII file format.

The mask house 1304 includes mask data preparation 1312 and mask fabrication 1314. The mask house 1304 uses the IC design layout diagram 1310 to manufacture one or more masks 1316 to be used for fabricating the various layers of the IC 1308 according to the IC design layout diagram 1310. The mask house 1304 performs mask data preparation 1312, where the IC design layout diagram 1310 is translated into a representative data file ("RDF"). The mask data preparation 1312 provides the RDF to the mask fabrication 1314. The mask fabrication 1314 includes a mask writer (not shown) that converts the RDF to an image on a substrate, such as a mask (reticle) 1316 on a semiconductor wafer. The IC design layout diagram 1310 is manipulated by the mask data preparation 1312 to comply with particular characteristics of the mask writer and/or requirements of the IC fab 1306. In FIG. 13, the mask data preparation 1312 and the mask fabrication 1314 are illustrated as separate elements. In some embodiments, the mask data preparation 1312 and the mask fabrication 1314 can be collectively referred to as a mask data preparation.

In some embodiments, the mask data preparation 1312 includes an optical proximity correction (OPC) that uses lithography enhancement techniques to compensate for image errors, such as those that can arise from diffraction, interference, other process effects and the like. The OPC adjusts the IC design layout diagram 1310. In some embodiments, the mask data preparation 1312 includes further resolution enhancement techniques (RET), such as off-axis illumination, sub-resolution assist features, phase-shifting masks, other suitable techniques, and the like or combinations thereof. In some embodiments, inverse lithography technology (ILT) is also used, which treats OPC as an inverse imaging problem.

In some embodiments, the mask data preparation 1312 includes a mask rule checker (MRC) (not shown) that checks the IC design layout diagram 1310 that has undergone processes in OPC with a set of mask creation rules that contain certain geometric and/or connectivity restrictions to ensure sufficient margins, to account for variability in semiconductor manufacturing processes, and the like. In some embodiments, the MRC modifies the IC design layout diagram 1310 to compensate for limitations during the mask fabrication, which may undo part of the modifications performed by OPC in order to meet mask creation rules.

In some embodiments, the mask data preparation 1312 includes lithography process checking (LPC) (not shown) that simulates processing that will be implemented by the IC fab 1306 to fabricate the IC 1308. LPC simulates this processing based on the IC design layout diagram 1310 to create a simulated manufactured device, such as the IC 1308. The processing parameters in LPC simulation can include parameters associated with various processes of the IC manufacturing cycle, parameters associated with tools used for manufacturing the IC, and/or other aspects of the manufacturing process. LPC takes into account various factors, such as aerial image contrast, depth of focus ("DOF"), mask error enhancement factor ("MEEF"), other suitable factors, and the like or combinations thereof. In some embodiments, after a simulated manufactured device has been created by LPC, and if the simulated device is not sufficiently close in shape to satisfy design rules, OPC and/or MRC are be repeated to further refine the IC design layout diagram 1310.

It should be understood that the above description of the mask data preparation 1312 has been simplified for the purposes of clarity. In some embodiments, the mask data preparation 1312 includes additional features such as a logic operation (LOP) to modify the IC design layout diagram 1310 according to manufacturing rules. Additionally, the processes applied to the IC design layout diagram 1310 during the mask data preparation 1312 may be executed in a variety of different orders.

After the mask data preparation 1312 and during the mask fabrication 1314, a mask 1316 or a group of masks 1316 are fabricated based on the IC design layout diagram 1310. In some embodiments, the mask fabrication 1314 includes performing one or more lithographic exposures based on the IC design layout diagram 1310. In some embodiments, an electron-beam (e-beam) or a mechanism of multiple e-beams is used to form a pattern on a mask(s) 1316 (photomask or reticle) based on the IC design layout diagram 1310. The mask(s) 1316 can be formed in various technologies. For example, in some embodiments, the mask(s) 1316 is formed using binary technology. In some embodiments, a mask pattern includes opaque regions and transparent regions. A radiation beam, such as an ultraviolet (UV) beam, used to expose the image sensitive material layer (e.g., photoresist) which has been coated on a wafer, is blocked by the opaque region and transmits through the transparent regions. In one example, a binary mask version of the mask(s) 1316 includes a transparent substrate (e.g., fused quartz) and an opaque material (e.g., chromium) coated in the opaque regions of the binary mask.

In another example, the mask(s) 1316 is formed using a phase shift technology. In a phase shift mask (PSM) version of the mask(s) 1316, various features in the pattern formed on the phase shift mask are configured to have a proper phase difference to enhance the resolution and imaging quality. In various examples, the phase shift mask can be attenuated PSM or alternating PSM. The mask(s) 1316 generated by the mask fabrication 1314 is used in a variety of processes. For example, a mask(s) 1316 is used in an ion implantation process to form various doped regions in the semiconductor wafer, in an etching process to form various etching regions in the semiconductor wafer, and/or in other suitable processes.

The IC fab 1306 includes wafer fabrication 1318. The IC fab 1306 is an IC fabrication business that includes one or more manufacturing facilities for the fabrication of a variety of different IC products. In some embodiments, the IC fab 1306 is a semiconductor foundry. For example, there may be a manufacturing facility for the front end fabrication of a plurality of IC products (FEOL fabrication), while a second manufacturing facility may provide the back end fabrication for the interconnection and packaging of the IC products (BEOL fabrication), and a third manufacturing facility may provide other services for the foundry business.

The IC fab 1306 uses the mask(s) 1316 fabricated by the mask house 1304 to fabricate the IC 1308. Thus, the IC fab 1306 at least indirectly uses the IC design layout diagram 1310 to fabricate the IC 1308. In some embodiments, a semiconductor wafer 1320 is fabricated by the IC fab 1306 using the mask(s) 1316 to form the IC 1308. In some embodiments, the IC fab 1306 includes performing one or more lithographic exposures based at least indirectly on the IC design layout diagram 1310. The semiconductor wafer 1320 includes a silicon substrate or other proper substrate having material layers formed thereon. The semiconductor wafer 1320 further includes one or more of various doped regions, dielectric features, multilevel interconnects, and the like (formed at subsequent manufacturing steps).

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

For example, poly lines are not limited to this configuration and can be made of any suitable conductive material. Similarly, metal layers and/or metal lines are not limited to metal and may be made of any suitable conductive material. In many embodiments, contacts can be formed with any suitable conductive material, such as metals or metal alloys. Additionally or alternatively, specific cell types and sub-cell cell types are disclosed herein, but other types of cell types and/or sub-cell types can be used in other embodiments.

In one aspect, a method of fabricating an analog cell includes a processing device receiving device specifications for an analog integrated circuit and partition information for the analog integrated circuit. Based on the device specifications and the partition information, the processing device determines first cut locations for a first set of cuts to be made along a first direction in the non-final layout of the analog integrated circuit and second cut locations for a second set of cuts to be made along a second direction in the non-final layout of the analog integrated circuit. The processing device cuts the non-final layout of the analog integrated circuit at the first cut locations to produce a temporary layout. The processing device cuts the temporary layout at the second cut locations to produce a plurality of sub-cells. The plurality of sub-cells is merged to produce a layout diagram of the analog integrated circuit.

In another aspect, a system includes a processing device and a memory operably connected to the processing device. The memory stores instructions that when executed by the processing device, cause operations to be performed. The operations include receiving device specifications for an analog integrated circuit and partition information for the analog integrated circuit. Based on the device specifications and the partition information, the processing device determines first cut locations for a first set of cuts to be made along a first direction in the non-final layout of the analog integrated circuit and second cut locations for a second set of cuts to be made along a second direction in the non-final layout of the analog integrated circuit. The processing device cuts the non-final layout of the analog integrated circuit at the first cut locations to produce a temporary layout. The processing device cuts the temporary layout at the second cut locations to produce a plurality of sub-cells. The plurality of sub-cells is merged to produce a merged layout diagram of the analog integrated circuit.

In yet another aspect, a method includes a processing device receiving device specifications and partition information for the analog cell. Based on the device specifications and the partition information, the processing device determines first cut locations for a first set of cuts to be made to a non-final layout of the analog cell along a first direction and second cut locations for a second set of cuts to be made to the non-final layout of the analog cell along a second direction. Based on the first cut locations and the second cut locations, the processing device partitions the analog cell into a plurality of sub-cells and verifies each sub-cell in the plurality of sub-cells. At least one sub-cell in the plurality of sub-cells is included in a library after the at least one sub-cell is verified. A layout of an integrated circuit is produced using the plurality of sub-cells.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A method of fabricating an analog integrated circuit, the method comprising:
   receiving, by a processing device, device specifications for the analog integrated circuit;
   receiving, by the processing device, partition information for the analog integrated circuit, wherein the partition information defines types of sub-cells within the analog integrated circuit, and wherein the types of sub-cells are defined at least in part by a number of polysilicon lines within each type of sub-cell;
   based on the device specifications and the partition information, determining, by the processing device, first cut locations for a first set of cuts to be made along a first direction in a non-final layout of the analog integrated circuit;
   based on the device specifications and the partition information, determining, by the processing device, second cut locations for a second set of cuts to be made along a second direction in the non-final layout of the analog integrated circuit;
   cutting, by the processing device, the non-final layout of the analog integrated circuit at the first cut locations to produce a temporary layout;
   cutting, by the processing device, the temporary layout at the second cut locations to produce a plurality of sub-cells; and
   merging, by the processing device, the plurality of sub-cells to produce a layout diagram of the analog integrated circuit.

2. The method of claim 1, further comprising verifying each sub-cell in the plurality of sub-cells prior to merging the sub-cells.

3. The method of claim 2, wherein verifying each sub-cell in the plurality of sub-cells comprises performing design rule checks on each sub-cell in the plurality of sub-cells.

4. The method of claim 2, wherein verifying each sub-cell in the plurality of sub-cells comprises performing a layout versus layout check on each sub-cell in the plurality of sub-cells.

5. The method of claim 1, further comprising verifying the layout diagram of the analog integrated circuit.

6. The method of claim 1, wherein the partition information further includes a starting point and an ending point along the first direction, and a starting point and an ending point along the second direction.

7. The method of claim 6, further comprising verifying each sub-cell in the plurality of sub-cells prior to merging the sub-cells, and including each verified sub-cell in a library.

8. The method of claim 1, further comprising fabricating the analog integrated circuit using the layout diagram.

9. A system, comprising:
   a processing device; and
   a storage device operably connected to the processing device and storing instructions, that when executed by the processing device, cause operations to be performed, the operations comprising:
   receiving device specifications for an analog integrated circuit;
   receiving partition information for the analog integrated circuit, wherein the partition information defines types of sub-cells within the analog integrated circuit, and wherein the types of sub-cells are defined at least in part by a number of polysilicon lines within each type of sub-cell;
   based on the device specifications and the partition information, determining first cut locations for a first set of cuts to be made along a first direction in a non-final layout of the analog integrated circuit;
   based on the device specifications and the partition information, determining second cut locations for a second set of cuts to be made along a second direction in the non-final layout of the analog integrated circuit;
   cutting the non-final layout of the analog integrated circuit at the first cut locations to produce a temporary layout;
   cutting the temporary layout at the second cut locations to produce a plurality of sub-cells; and
   merging the plurality of sub-cells to produce a merged layout diagram of the analog integrated circuit.

10. The system of claim 9, wherein the storage device stores further instructions for verifying each sub-cell in the plurality of sub-cells.

11. The system of claim 10, wherein verifying each sub-cell in the plurality of sub-cells comprises performing design rule checks on each sub-cell in the plurality of sub-cells.

12. The system of claim 10, wherein verifying each sub-cell in the plurality of sub-cells comprises performing a layout versus layout check on each sub-cell in the plurality of sub-cells.

13. The system of claim 9, wherein the storage device stores further instructions for verifying the merged layout diagram of the analog integrated circuit.

14. The system of claim 9, wherein the partition information further includes a starting point and an ending point along the first direction, and a starting point and an ending point along the second direction.

15. The system of claim 9, wherein the storage device stores further instructions for verifying each sub-cell in the plurality of sub-cells, and including verified sub-cells in a library.

16. The system of claim 9, further comprising an input device that transmits the device specifications and the partition information to the processing device.

17. The system of claim 9, wherein the system comprises a computing device.

18. A method, comprising:
   receiving, by a processing device, device specifications for an analog cell;
   receiving, by the processing device, partition information for the analog cell, wherein the partition information defines types of sub-cells within the analog cell, and wherein the types of sub-cells are defined at least in part by a number of polysilicon lines within each type of sub-cell;
   based on the device specifications and the partition information, determining, by the processing device, first cut locations for a first set of cuts to be made to a non-final layout of the analog cell along a first direction;
   based on the device specifications and the partition information, determining, by the processing device, second cut locations for a second set of cuts to be made to the non-final layout of the analog cell along a second direction;
   based on the first cut locations and the second cut locations, partitioning, by the processing device, the analog cell into a plurality of sub-cells;
   verifying, by the processing device, each sub-cell in the plurality of sub-cells; and producing, by the processing device, a layout of an integrated circuit using the plurality of sub-cells.

19. The method of claim 18, wherein:
the first cut locations and the second cut locations are determined based on a type of each sub-cell.

20. The method of claim 18, wherein verifying each sub-cell in the plurality of sub-cells comprises at least one of:
performing design rule checks on each sub-cell in the plurality of sub-cells; or
performing a layout versus layout check on each sub-cell in the plurality of sub-cells.

* * * * *